United States Patent
Keyser-Allen et al.

(10) Patent No.: US 10,248,376 B2
(45) Date of Patent: Apr. 2, 2019

(54) MULTIPLE GROUPINGS IN A PLAYBACK SYSTEM

(71) Applicant: Sonos, Inc., Santa Barbara, CA (US)

(72) Inventors: Lee Keyser-Allen, Santa Barbara, CA (US); Jillian Garber, Santa Barbara, CA (US); Arthur Coburn, IV, Santa Barbara, CA (US)

(73) Assignee: SONOS, INC., Santa Barbara, CA (US)

( * ) Notice: Subject to any disclaimer, the term of this patent is extended or adjusted under 35 U.S.C. 154(b) by 132 days.

(21) Appl. No.: 14/737,199

(22) Filed: Jun. 11, 2015

(65) Prior Publication Data
US 2016/0364206 A1    Dec. 15, 2016

(51) Int. Cl.
*G06F 17/00* (2006.01)
*G06F 3/16* (2006.01)
(Continued)

(52) U.S. Cl.
CPC ............. *G06F 3/165* (2013.01); *G05B 15/02* (2013.01); *H04R 27/00* (2013.01); *H04R 29/007* (2013.01);
(Continued)

(58) Field of Classification Search
CPC ....... G06F 3/165; H04R 27/00; H04R 29/007; H04R 2227/003; H04R 2227/005
(Continued)

(56) References Cited

U.S. PATENT DOCUMENTS 5,361,381 A * 11/1994 Short ................... H04R 29/001
                                                                  381/100
5,440,644 A    8/1995 Farinelli et al.
(Continued)

FOREIGN PATENT DOCUMENTS

| EP | 1389853 A1 | 2/2004 |
|---|---|---|
| WO | 0153994 A2 | 7/2001 |
| WO | 2003093950 A2 | 11/2003 |
| WO | 2014209952 A1 | 12/2014 |

OTHER PUBLICATIONS

"AudioTron Quick Start Guide, Version 1.0", Voyetra Turtle Beach, Inc., Mar., 2001, 24 pages.
(Continued)

*Primary Examiner* — Paul C McCord

(57) ABSTRACT

The examples provided herein involve multiple groups in a playback system. An example method involves facilitating storage of a configuration of multiple zone groups as a multi-zone scene of a media playback system, the media playback system including at least a first zone group including at least two zone players and a second zone group, a user interface of a controller presenting at least an indication of (1) the first zone group, (2) the second zone group, and (3) a multi-zone group scene creation command. The method involves generating, based on a detected triggering of the multi-zone group scene creation command, a multi-zone scene configuration including stored configuration data for the first zone group and the second zone group to instantiate the multi-zone scene based on identified parameters associated with the captured configuration of the multiple zone groups of the media playback system, the parameters including (1) zone players currently associated with the first zone group and the second zone group, and (2) an indication that the first zone group and the second zone group belong to the multi-zone group scene, and transmitting the configuration data to at least a first zone player in the first zone group for subsequent instantiation of the multi-zone group scene.

21 Claims, 13 Drawing Sheets

(51) Int. Cl.
 *G05B 15/02* (2006.01)
 *H04R 27/00* (2006.01)
 *H04R 29/00* (2006.01)
(52) U.S. Cl.
 CPC .. *H04R 2227/003* (2013.01); *H04R 2227/005* (2013.01)
(58) Field of Classification Search
 USPC .......................... 700/94; 381/104–109, 117
 See application file for complete search history.

(56) References Cited

U.S. PATENT DOCUMENTS

| | | | |
|---|---|---|---|
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,483,538 | B2 | 1/2009 | McCarty et al. |
| 7,571,014 | B1* | 8/2009 | Lambourne ............ H04R 27/00 700/94 |
| 7,630,501 | B2* | 12/2009 | Blank ..................... H04S 7/301 381/300 |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,921,369 | B2* | 4/2011 | Bill ................... G06F 17/30749 709/206 |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,290,603 | B1* | 10/2012 | Lambourne ............ G11B 27/00 381/104 |
| 8,423,893 | B2 | 4/2013 | Ramsay et al. |
| 8,483,853 | B1* | 7/2013 | Lambourne .............. H04R 3/12 381/107 |
| 8,554,347 | B2* | 10/2013 | Suyama ................ H04R 29/007 381/104 |
| 8,762,565 | B2 | 6/2014 | Togashi et al. |
| 8,843,500 | B2* | 9/2014 | Nogues ............ G06F 17/30749 707/726 |
| 8,903,526 | B2* | 12/2014 | Beckhardt ............... G06F 3/165 381/394 |
| 8,965,544 | B2 | 2/2015 | Ramsay |
| 8,971,546 | B2* | 3/2015 | Millington ............ H04L 12/282 381/105 |
| 9,246,866 | B1* | 1/2016 | Sanders ............. G06Q 30/0201 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0063755 | A1* | 4/2003 | Nourse ................ H04R 29/007 381/82 |
| 2003/0157951 | A1 | 8/2003 | Hasty |
| 2003/0185400 | A1* | 10/2003 | Yoshizawa .............. H04R 5/02 381/58 |
| 2004/0024478 | A1 | 2/2004 | Hans et al. |
| 2004/0037433 | A1* | 2/2004 | Chen ........................ H04S 3/00 381/79 |
| 2004/0223622 | A1* | 11/2004 | Lindemann .............. H04R 5/04 381/79 |
| 2004/0228367 | A1* | 11/2004 | Mosig ............... H04L 29/06027 370/503 |
| 2005/0021590 | A1* | 1/2005 | Debique ................... G06F 9/50 709/200 |
| 2007/0142944 | A1 | 6/2007 | Goldberg et al. |
| 2008/0152312 | A1* | 6/2008 | Levy ..................... H04N 5/4401 386/347 |
| 2008/0177822 | A1* | 7/2008 | Yoneda ................. H04L 12/282 709/202 |
| 2009/0076881 | A1* | 3/2009 | Svendsen ............... G06Q 10/06 705/14.51 |
| 2009/0179867 | A1* | 7/2009 | Shim .................... G06F 3/04883 345/173 |
| 2009/0234476 | A1* | 9/2009 | Yoshida ............. G06F 17/30035 700/94 |
| 2010/0017714 | A1* | 1/2010 | Agarwal ................ G06Q 10/00 715/716 |
| 2010/0115562 | A1* | 5/2010 | Koike .................... H04R 27/00 725/78 |
| 2010/0325239 | A1* | 12/2010 | Khedouri .......... G06F 17/30094 709/217 |
| 2012/0054278 | A1* | 3/2012 | Taleb .................... G06Q 50/01 709/204 |
| 2012/0121105 | A1* | 5/2012 | Holladay ............... H04R 27/00 381/81 |
| 2013/0014015 | A1 | 1/2013 | Lambourne et al. |
| 2013/0080955 | A1 | 3/2013 | Reimann et al. |
| 2013/0111347 | A1* | 5/2013 | Reilly .................... H04R 27/00 715/716 |
| 2013/0223642 | A1 | 8/2013 | Warren et al. |
| 2013/0238108 | A1* | 9/2013 | Millington ............ H04J 3/0664 700/94 |
| 2013/0253679 | A1 | 9/2013 | Lambourne |
| 2013/0317635 | A1* | 11/2013 | Bates ..................... H04R 27/00 700/94 |
| 2013/0331970 | A1* | 12/2013 | Beckhardt ............... G06F 3/165 700/94 |
| 2013/0339397 | A1* | 12/2013 | Herasymchuk ... G06F 17/30029 707/803 |
| 2014/0037107 | A1* | 2/2014 | Marino, Jr. .............. H03G 3/10 381/107 |
| 2014/0122590 | A1* | 5/2014 | Svendsen ............. H04N 21/252 709/204 |
| 2014/0181659 | A1* | 6/2014 | Kumar ............. H04N 21/44222 715/716 |
| 2014/0230015 | A1* | 8/2014 | Pollock .................... H04L 63/10 726/3 |
| 2014/0310058 | A1* | 10/2014 | Aral ........................ G06Q 50/01 705/7.29 |
| 2015/0092959 | A1 | 4/2015 | Agustin et al. |
| 2015/0179227 | A1* | 6/2015 | Russell .............. H04N 21/4122 386/201 |
| 2015/0186110 | A1* | 7/2015 | Kannan .................. G06F 3/167 715/728 |
| 2015/0237409 | A1* | 8/2015 | Harper .............. H04N 21/6543 725/19 |
| 2015/0245138 | A1* | 8/2015 | Bender .................... H04R 5/04 381/80 |
| 2015/0286360 | A1* | 10/2015 | Wachter .................. G06F 3/14 345/173 |
| 2016/0026429 | A1* | 1/2016 | Triplett .................. G06F 3/165 715/716 |
| 2016/0180248 | A1* | 6/2016 | Regan ..................... G06N 5/04 706/12 |

OTHER PUBLICATIONS

"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
"Bluetooth. "Specification of the Bluetooth System: The ad hoc SCATTERNET for affordable and highly functional wireless connectivity" Core, Version 1.0 A, Jul. 26, 1999, 1068 pages".

(56) References Cited

OTHER PUBLICATIONS

"Bluetooth. "Specification of the Bluetooth System: Wireless connections made easy" Core, Version 1.0 B, 1 Dec. 1, 1999, 1076 pages".
"Dell, Inc. "Dell Digital Audio Receiver: Reference Guide" Jun. 2000, 70 pages".
"Dell, Inc. "Start Here" Jun. 2000, 2 pages".
"Jo, J. et al., "Synchronized One-to-many Media Streaming with Adaptive Playout Control," Proceedings of SPIE, 2002, pp. 71-82, vol. 4861".
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3" TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
"UPnP; "Universal Plug and Play Device Architecture"; Jun. 8, 2000; version 1.0; Microsoft Corporation; pp. 1-54".
"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Searching Authority, International Search Report and Written Opinion dated Aug. 5, 2016, issued in connection with International Application No. PCT/US2016/033804, filed on May 23, 2016, 12 pages.
International Bureau, International Preliminary Report on Patentibility and Written Opinion, dated Dec. 21, 2017, issued in connection with International Application No. PCT/US2016/033804, filed on May 23, 2016, 10 pages.

\* cited by examiner

```
<?zonescene_control version="1.0" encoding="UTF-8"?>
<zoneplayer_local>
    <local_id>Living Room</local_id>
    <local_members>"LR_ZP_1; LR_ZP_2; LR_ZP_3"</local_members>
    <other_zones>"Patio; Nursery; Office; MasterBed; HomeTheater"</other_zones>
<zonescene_control>
    <zonescene>
        <ZC_Id>BBQ</ZC_Id>
        <Vol>60</Vol>
        <Source>"https://www.bluestreetjazz.com/stream/track?id=234&stream=1"</Source>
        <Scene_Members>"Living Room; Patio"</Scene_Members>
        <Source_ALL>TRUE</Source_ALL>
    </zonescene>
    <zonescene>
        <ZC_Id>Gameday</ZC_Id>
        <Vol>100</Vol>
        <Source>Television</Source>
        <Scene_Members>"Office; Kitchen; Living Room"</Scene_Members>
        <Exclude_Members>"Nursery"</Exclude_Members>
        <Source_ALL>TRUE</Source_ALL>
    </zonescene>
    <zonescene>
        <ZC_Id>PARTY</ZC_Id>
        <Vol>45</Vol>
        <Source1>"https://www.memphisblues.com/stream/track?id=41387&stream=1"</Source1>
        <Source2>"https://www.bluestreetjazz.com/stream/track?id=234&stream=1"</Source2>
        <Scene_Members>"BBQ; Gameday"</Scene_Members>
        <Source_ALL>FALSE</Source_ALL>
            <Source1_Play>"BBQ"</Source1_Play>
            <Source2_Play>"Gameday"</Source2_Play>
    </zonescene>
</zonescene_control>
</zoneplayer_local>
```

FIGURE 6

MULTIPLE GROUPINGS IN A PLAYBACK SYSTEM

FIELD OF THE DISCLOSURE

The disclosure is related to consumer goods and, more particularly, to methods, systems, products, features, services, and other elements directed to media playback or some aspect thereof. Multi-zone group scenes, as disclosed herein, build upon the concepts disclosed by Lambourne et al. in U.S. Pat. No. 8,483,853 which is hereby incorporated herein by reference in its entirety.

BACKGROUND

Options for accessing and listening to digital audio in an out-loud setting were limited until in 2003, when SONOS, Inc., filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 6 shows an example data structure including configuration data for multi-zone group scenes;

Figure 1:
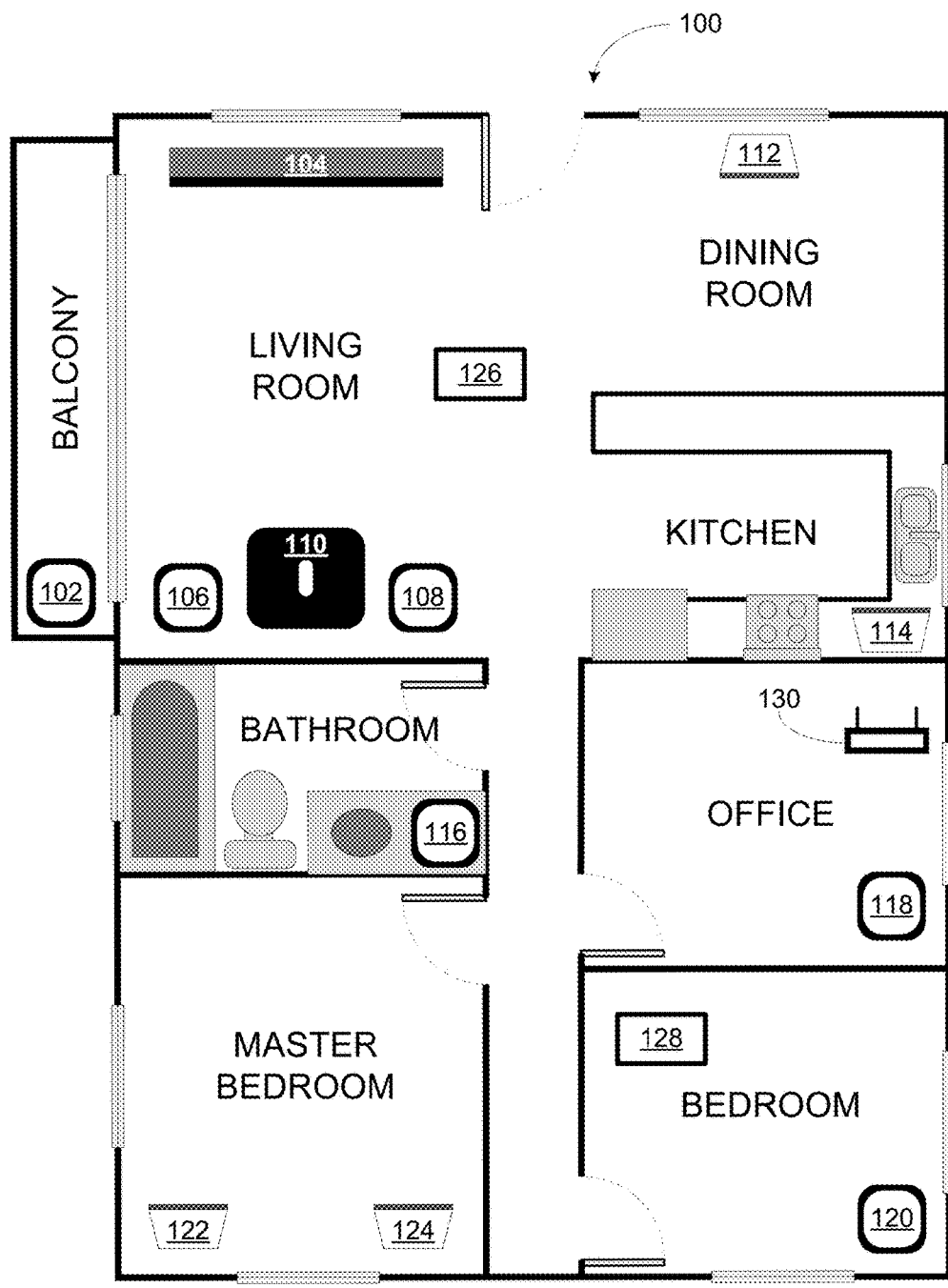
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

A media playback system provides media playback through one or more areas of a household and/or other location. One or more zones associated with the media playback system can be configured in a zone scene or zone theme to output media content as a group, for example. According to a zone scene, one or more zones in the media playback system can be linked, grouped, and/or otherwise configured to play back media according to certain attributes and/or other configuration parameters. Zone scene configuration information can be stored at one or more of a controller, playback device, network attached storage device, etc.

In one embodiment, a controller of a media playback system provides an interface to create multi-zone group scenes including zone players (also referred to herein as playback devices or media playback devices, etc.) and/or zone groups and associated configuration information. In certain examples, a multi-zone group scene can be stored locally at the control device and transmitted to at least one zone player of at least one zone group in the media playback system. In other examples, a multi-zone group scene can be stored at a zone player, an external server, network attached storage device, etc.

For example, a controller is used to create a "household" multi-zone group scene to play jazz music. The zone groups included in the "household" multi-zone group scene include a kitchen, patio, and living room zone group. One or more of the zone groups include multiple zone players. When the "household" multi-zone group scene is created on the controller, the controller stores configuration data for the "household" multi-zone group scene locally and transmits the configuration data to a first zone player in the kitchen zone group.

The multi-zone group scene provides a hierarchy of multiple zones forming a multi-zone group scene, and one or more of the constituent zones includes a plurality of zone players organized according to that zone. By invoking the multi-zone group scene, one or more zone groups and their constituent zone players are triggered to instantiate the specified configuration. Thus, the multi-zone group scene configuration can specify configuration (e.g., grouping, content, equalization setting, etc.) for one or more zone groups as well as one or more zone players within each of the one or more zone groups.

In another embodiment, the controller provides an interface to instantiate created and/or stored multi-zone group scenes. The multi-zone group scene is instantiated by transmitting a command from the controller to at least one zone player of one zone group in the multi-zone group scene.

For example, the controller interface is used to recall and/or instantiate the "household" multi-zone group scene to play jazz music (e.g., by selecting the "household" multi-zone group scene). When the "household" multi-zone group scene is selected on the controller, the controller transmits an instruction to instantiate the "household" multi-zone group scene to the first zone player in the kitchen zone group.

When the instruction to instantiate the "household" multi-zone group scene is detected by the first zone player in the kitchen zone group, the first zone player operates under the configuration data for the "household" multi-zone group scene. The first zone player in the kitchen zone group also relays (e.g., transmits) the instructions to instantiate the "household" multi-zone group scene to other zone players in the patio and living room zone groups. The other players in the patio and living room zone groups operate under the configuration data for the "household" multi-zone group scene in response to the other player's detection of the instructions to instantiate.

In another embodiment, rather than routing communications through the first zone player, the controller instead communicates with each zone player in the multi-zone group scene to instantiate the multi-zone group scene. Rather than relying on a first zone player to relay communications from the controller to other participating zone players, the controller can directly communicate with member zone players to instantiate the multi-zone group scene.

In another embodiment, a playback device (e.g., a zone player) stores and/or transmits the multi-zone group scene configuration data to other zone groups in the multi-zone group scene. The playback device likewise determines that the multi-zone group scene is to be instantiated, transmits the command to other zone groups in the multi-zone group scene, and operates according to the configuration data for the multi-zone group scene.

For example, in the first embodiment, the first zone player in the kitchen zone group relays (e.g., transmits) the configuration data to other zone players in the patio and living room zone groups. In the second embodiment, during instantiation of the multi-zone group scene, the first zone player in the kitchen zone group relays (e.g., transmits) instructions to instantiate the "household" multi-zone group scene to other zone players in the patio and living room zone groups. The other players in the patio and living room zone groups operate under the configuration data for the "household" multi-zone group scene in response to the other player's detection of the instructions to instantiate.

As indicated above, the examples provided herein involve multiple groups in a playback system. In one aspect, a method is provided. The method involves facilitating, via a user interface of a controller, storage of a configuration of multiple zone groups as a multi-zone scene of a media playback system, the media playback system including at least a first zone group including at least two zone players and a second zone group, the user interface of the controller presenting at least an indication of (1) the first zone group, (2) the second zone group, and (3) a multi-zone group scene creation command. The method involves generating, via the controller based on a detected triggering of the multi-zone group scene creation command, a multi-zone scene configuration including stored configuration data for the first zone group and the second zone group to instantiate the multi-zone scene based on identified parameters associated with the captured configuration of the multiple zone groups of the media playback system, the parameters including (1) zone players currently associated with the first zone group and the second zone group, and (2) an indication that the first zone group and the second zone group belong to the multi-zone group scene, and transmitting the configuration data to at least a first zone player in the first zone group for subsequent instantiation of the multi-zone group scene. In some examples, the controller may save the multi-zone scene configuration data. In other examples, the multi-zone scene configuration data may be stored elsewhere (e.g., a zone player, other external storage, etc.), and the controller send an instruction or command to one or more zone players involved in the multi-zone group scene.

In another aspect, a device or apparatus is provided. The apparatus may include a controller, zone player, etc. The apparatus includes a processor, and memory having stored thereon instructions executable by the processor to cause the device to perform functions. The functions include facilitating, via a user interface of the apparatus, storage of a configuration of multiple zone groups as a multi-zone scene of a media playback system, the media playback system including at least a first zone group including at least two zone players and a second zone group, the user interface presenting at least an indication of (1) the first zone group, (2) the second zone group, and (3) a multi-zone group scene creation command. The functions include generating, based on a detected triggering of the multi-zone group scene creation command, a multi-zone scene configuration including stored configuration data for the first zone group and the second zone group to instantiate the multi-zone scene based on identified parameters associated with the captured configuration of the multiple zone groups of the media playback system, the parameters including (1) zone players currently associated with the first zone group and the second zone group, and (2) an indication that the first zone group and the second zone group belong to the multi-zone group scene, and transmitting the configuration data to at least a first zone player in the first zone group for subsequent instantiation of the multi-zone group scene.

In yet another aspect, a non-transitory computer readable memory is provided. The non-transitory computer readable memory has stored thereon instructions executable by a computing device to cause the computing device to perform functions. The functions include facilitating, via a user interface, storage of a configuration of multiple zone groups as a multi-zone scene of a media playback system, the media playback system including at least a first zone group including at least two zone players and a second zone group, the user interface presenting at least an indication of (1) the first zone group, (2) the second zone group, and (3) a multi-zone group scene creation command. The functions include generating, based on a detected triggering of the multi-zone group scene creation command, a multi-zone scene configuration including stored configuration data for the first zone group and the second zone group to instantiate the multi-zone scene based on identified parameters associated with the captured configuration of the multiple zone groups of the media playback system, the parameters including (1) zone players currently associated with the first zone group and the second zone group, and (2) an indication that the first zone group and the second zone group belong to the multi-zone group scene, and transmitting the configuration data to at least a first zone player in the first zone group for subsequent instantiation of the multi-zone group scene.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
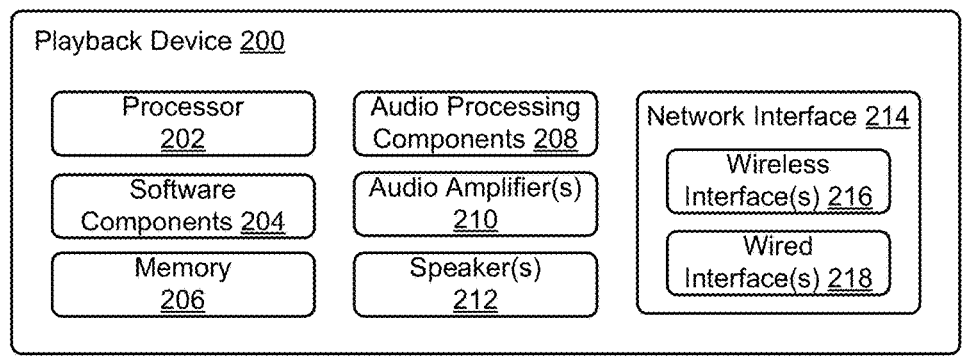
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
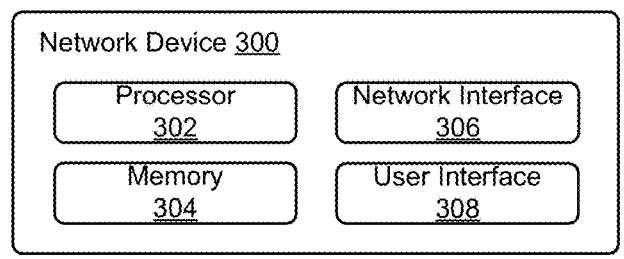
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
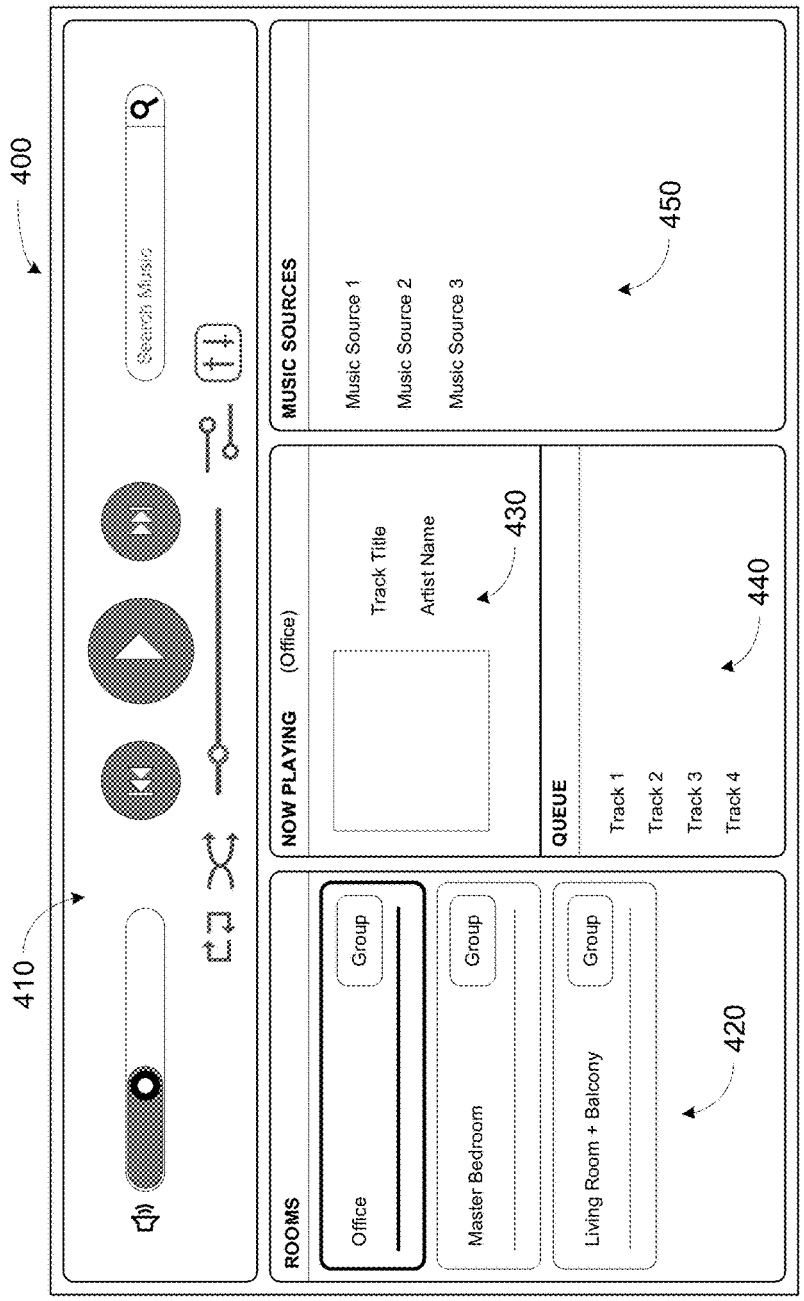
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Multiple Groupings in a Playback System

As discussed above, embodiments described herein may involve storing a configuration of multiple zone groups as a multi-zone group scene of the media playback system. As used herein, multi-zone group scene and multi zone scene are used interchangeably. For example, a media playback system may include a large number of zone players scattered throughout a house. Further, each zone player may be further configured into a zone group to provide unique collections of zone players and playback of varying media content in each zone group. Systems and methods disclosed herein allow for easy re-access to and re-instantiation of previous configurations of one or more zone groups.

Example embodiments disclosed herein enable storage of configuration data for a multiple-zone group scene, the configuration data including the configuration of the multiple zone groups in the media playback system. For example, after the command to store the configuration of the multiple zone groups as a multi-zone group scene of the media playback system, the configuration data may be stored at a controller, a zone player, and/or a networked attached storage device, etc., in the media playback system. In some examples, the controller stores the configuration data and transmits the configuration data to a zone player in the media playback system. The zone player may then transmit the configuration data to other zone players in the media playback system regardless of current zone grouping. In other examples, the controller stores the configuration data and transmits the configuration data to the zone player at the time the multi-zone group scene is requested to be instantiated. In yet other examples, the zone player may transmit the configuration data to the controller and/or other controllers associated with the media playback system. For example, the zone player may store the configuration data and transmit the configuration data to the controller to be used for selection and re-instantiation. In other examples, an external storage (e.g., a computer, network attached storage, etc.) can store the configuration data, which is then retrieved by the zone player and/or controller for use, display, selection, and so on.

In some examples, a first zone group of the multiple zone groups contains more than one zone player and a second zone group of the multiple zone groups contains at least one zone player. In other examples, all zone groups in the media playback system may be grouped into a multi-zone group scene. Conversely, in yet other examples, no zone groups may be included in the multi-zone group scene. However, it will be appreciated from the disclosed embodiments that any combination of zone groups (regardless of the number of zone players associated with each group) may be selected for configuration in a multi-zone group scene.

Example embodiments disclosed herein return to and/or instantiate the multi-zone group scene (e.g., in response to a user command to do so), by transmitting a command to trigger the multi-zone group scene to at least a first zone player in the media playback system. For example, when a multi-zone group scene is selected to be instantiated (e.g., via a user interface of a controller) the controller transmits the command to a zone player in the media playback system. When the zone player receives the command, the zone player may relay the command to at least one other zone player in the media playback system. In some examples, the command to instantiate the multi-zone group scene (e.g., transmitted from the controller to the first zone player) includes the configuration data for the multi-zone group scene. In other examples, the command to instantiate the multi-zone group scene causes at least one zone player to instantiate the multi-group scene according to configuration data previously stored by the at least one zone player. In other examples, the controller transmits the command to instantiate to more than one zone player in the media playback system.

In some examples, the controller interface may be used to create a "snapshot" of the current state of the media playback system and store the snapshot as a multi-zone group scene. For example, a selection to snapshot the media playback system can trigger the storing of the configuration of each zone group in the media playback system. The example snapshot may be associated with an identification (e.g., a name provided via the controller for the multi-zone group scene) and stored locally at the controller and/or a zone player of the media playback system. The identification may be later used to re-instantiate the snapshot of the media playback system at a later time.

In an illustrative example, a controller in a media playback system is used create a multi-zone group scene for a game day experience in a household. On or before the first game day for a particular sports team, the controller is used to configure different zone groups to provide unique content associated with the game providing a uniquely tailored auditory game day experience. For example, a kitchen zone group (e.g., the kitchen zone group comprising at least one zone player) is configured to present audio associated with a radio broadcast (e.g., the home radio play-by-play) and a living room zone group and a patio zone group (e.g., the living room and patio zone groups each including multiple zone players) are configured to present audio from a television broadcast of the game. Additionally, one or more other zone(s) (e.g., a bathroom zone, foyer zone, etc.) may also be configured to play music (e.g., streaming audio) while the kitchen, living room, and patio zone groups are playing game-related content. Further options may also be configured in conjunction with the multi-zone group scene such as, for example, a) a volume level for audio playback for each zone in the zone group, b) a mute or unmute setting for audio playback, c) media content for playback, d) a play mode setting, e) an equalization setting for audio playback, and f) an audio alarm (e.g., these options are not considered to be exhaustive, in fact, many other options may be saved in conjunction with audio and/or equalization settings with regard to the multi-zone group scene).

When the media playback system is configured for the game day multi-zone group scene, the controller detects a selection to create a multi-zone group scene and stores the current multi-zone groupings and each zone group's configuration as a "Gameday" multi-zone group scene. Configuration data for the multi-zone group scene for the game day experience is saved so that the "Gameday" scene may instantiated again with the selection of the "Gameday" multi-zone group scene. For example, the configuration data may be stored on the controller and/or a zone player in the media playback system. That is, on future game days, the "Gameday" multi-zone group scene may be re-instantiated without having to reconfigure each zone group in the media playback system.

In some examples, a stored multi-zone group scene is invoked in response to an alarm configured via the controller and/or other interface. For example, a certain multi-zone group scene may be instantiated in response to a zone player detecting the controller is in proximity to the zone player. As another example, the media playback system may be in communication with other devices in the homes (e.g., via Internet of Things (IoT), Bluetooth™, Wi-Fi, and/or other communication protocol) such that a multi-zone group scene may be instantiated when certain actions in the home are detected. Such actions include unlocking and/or opening of doors, turning on lights, motion detection, etc.

Figure 5A:
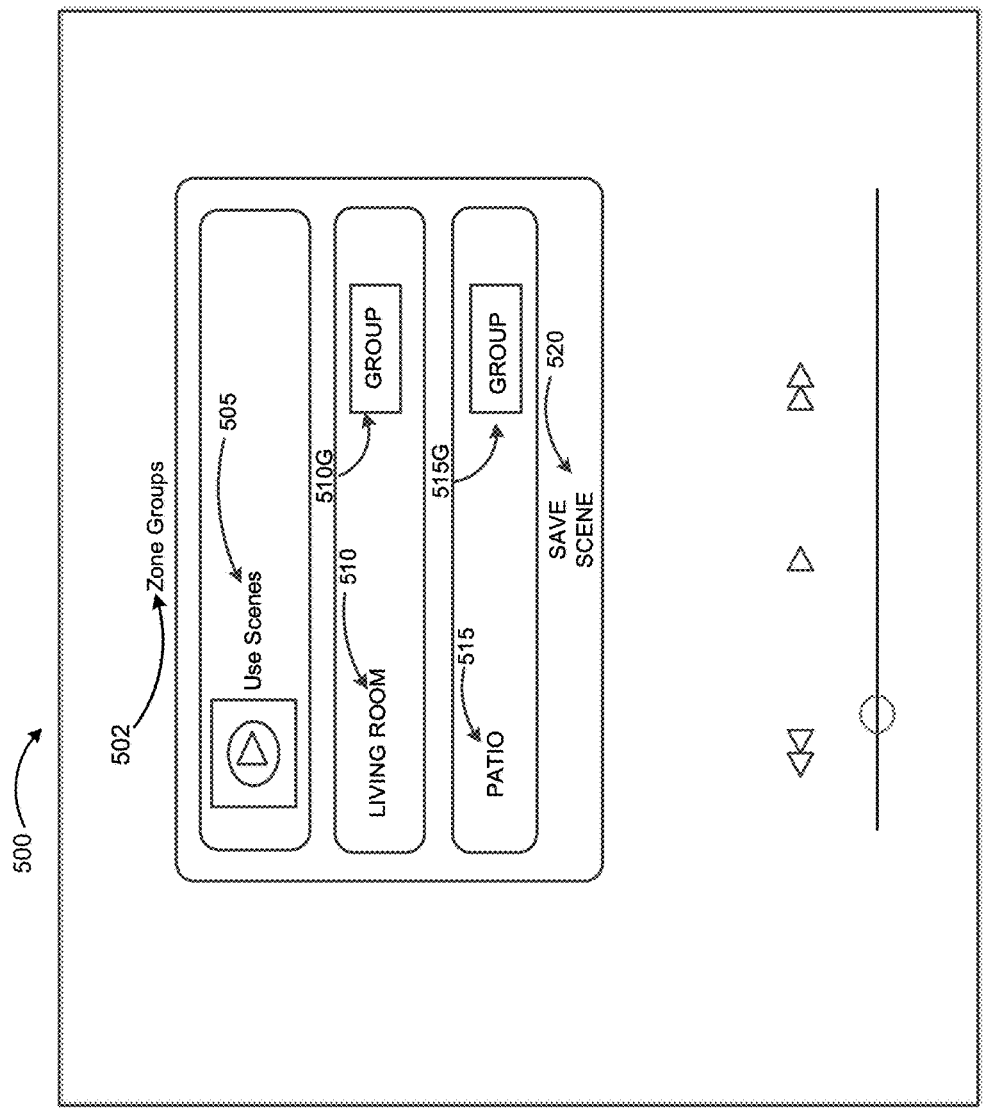
FIG. 5A shows an example user interface for creating a multi-zone group scene.

FIG. 5A shows an example user interface 500 that may be displayed on a computing device and/or controller to create and store a multi-zone group scene. The interface 500 includes a zone groups menu option 502 and a graphical indicator 505 for a command to "Use Scenes." The "Use Scene" command is an example command to store a configuration of multiple zone groups as a multi-zone group scene.

For example, when the graphical indicator 505 is selected, further options including the current zone groups appear to in the interface 500 (e.g., a list and/or a representation of current zone groups). In the illustrated example, the selection of graphical indicator 505 reveals (1) zone groups in the media playback system (living room 510 and patio 515), (2) grouping options for each of the particular zone groups (e.g., living room grouping option 510G and patio grouping option 515G), and (3) a second graphical indicator 520 to store and/or save the multi-zone group scene (e.g., "Save Scene"). Selection of the second graphical indicator 520 stores configuration data regarding current groupings of the zone groups in the media playback system as a multi-zone group scene. In some examples, zone groups may be selectively included in the multi-zone group scene using "group" indicators depicted in the interface 500. In yet other examples, check marks, radio buttons, and/or other icons may be used in place of "group indicators."

In the illustrated example, the living room zone group contains at least two zone players and the patio zone group contains at least one zone player. However, in other examples, the patio zone group may include more than one zone player.

Alternatively, an additional icon may be shown in the interface 500 that, when selected, captures a snapshot of the media playback system. For example, when the media playback system is configured to a user's preference, depressing and/or selecting the additional icon captures and stores a configuration of multiple zone groups as a multi-zone scene. That is, the current state of the media playback system (e.g., including current groupings, media playback, volume and/or equalization setting, network connections, system state variable(s), routing table, playlist, queues, etc.) is saved as a multi-zone group scene. Essentially, this option creates a snapshot of the current state of the media playback system. This snapshot option serves as another option to generate a multi-zone group scene for the media playback system. For example, in the above Gameday scenario, the snapshot option may be selected after configuring the media playback system to the desired operation offering an expedited option for multi-zone group scene generation. These snapshot multi-zone group scenes may be stored and recalled (e.g., re-instantiated) in the same way as non-snapshot multi-zone group scenes. That is, the snapshot multi-zone group scenes may be stored on local storage of zone players, stored on the controller, and/or stored in a remote server that may be referenced and/or obtained by a zone player and/or controller.

In some examples, an option to cancel the storage of the multi-zone group scene may be provided in the example interface 500.

Figure 5B:
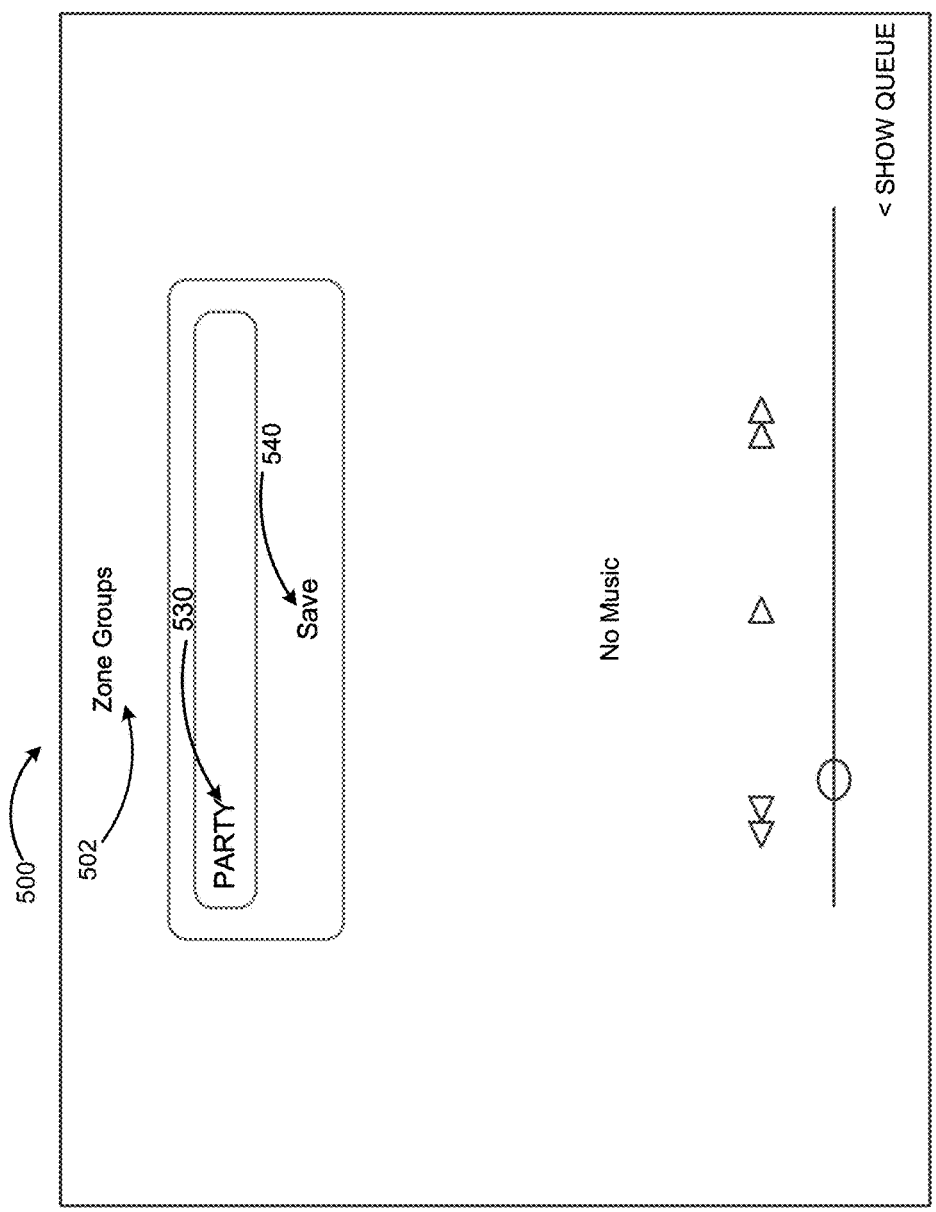
FIG. 5B shows an example user interface for creating a multi-zone group scene.

FIG. 5B shows an embodiment of the user interface 500 of FIG. 5A after the command to save the multi-zone group scene has been detected. In the illustrated example, a prompt 530 is presented to the user to name the stored multi-zone group scene. The example multi-zone group scene of FIG. 5B is named "Party" in the prompt 530. When the name of the multi-zone group scene is provided in the prompt 530, selecting the graphical "Save" indicator 540 stores the multi-zone group scene. In some examples, where a name is not provided in the prompt, a default name may be assigned to the multi-zone group scene. In other examples, an option is provided in the interface 500 to delete previously stored multi-zone group scenes.

FIG. 6 depicts an example data structure 600 containing configuration data for different multi-zone group scenes. While the data structure can be implemented in many other ways (e.g., a state/look up table, topology/configuration parameter, etc.), In the illustrated example, the data structure contains data for a Living Room zone group (e.g., including a plurality of zone players) and is stored on both the controller for the media playback system and a first zone player of the plurality of zone players in the example Living Room zone group. As discussed above, however, the configuration data may be stored in a variety of ways over multiple embodiments.

The example data structure contains media playback system identification data 605 including a self-identification and an identification of other zone groups in the media playback system. The data structure further includes configuration data 610, 615, 620 for a plurality of multi-zone group scenes.

For example, the BBQ multi-zone group scene configuration data 610 includes one or more parameters specifying a volume level and an associated media source location to be presented when the BBQ multi-zone group scene is instantiated. The BBQ multi-zone group scene also includes an identification of other zone groups (e.g., one or more of which include multiple zone players, etc.) that are configured for media playback when the BBQ multi-zone group scene is instantiated. In the illustrated example of FIG. 6, the BBQ multi-zone group scene further includes a parameter or other setting that identifies members of the multi-zone group scene are to present the same media (e.g., the Source_ALL parameter). This parameter, as explained in further detail below, allows for a variety of media to be presented in different zone groups when the multi-zone scene is instantiated. Alternatively, in some examples, there may be an indication of no media to be presented. That is, the absence of a media source indicates no pre-configured media is to be presented when the multi-zone group scene is instantiated (or re-instantiated).

The Gameday multi-zone group scene configuration data 615 includes an additional parameter to exclude certain zone groups from inclusion in the multi-zone group scene. In the illustrated example, the Gameday multi-zone group scene includes configuration data that excludes the "Nursery" zone group from being included in the Gameday multi-zone group scene. For example, if the nursery zone group was identified as an excluded zone, the nursery zone group would not be available to add to the Gameday multi-zone group scene until the nursery zone group was no longer identified as an excluded zone group (e.g., through removal via a user interface of a controller and/or computing device). Thus, if the Nursery were grouped with the Kitchen zone group prior to invocation of the Gameday multi-zone group scene and Kitchen was part of the scene but Nursery was not, instantiation of the scene would break the Nursery-Kitchen grouping and would not include the Nursery in the Gameday configuration.

In certain examples, however, an exclude zone group (e.g., Nursery) could be added after the scene is invoked (e.g., manually by user and/or another override setting, parameter, etc.). Thus, for example, if the Nursery was excluded in the saved Gameday multi-zone group scene configuration, the Nursery could be added after instantiation of the scene, and such addition of the Nursery zone group could be temporary and/or could be added to update a stored Gameday multi-zone group scene configuration, for example. In other examples, if the Nursery were grouped with the Kitchen prior to instantiation of the Gameday scene, the existing grouping could result in the Nursery being automatically brought into the Gameday multi-zone group scene based on its existing grouping with the Kitchen zone group (which was already part of the stored Gameday scene configuration).

The Party multi-zone group scene configuration data 620 includes additional membership parameters identifying zone groups belonging to the multi-zone group scene via zone scene identifiers (e.g., zone group and/or multi-zone group scene names). For example, via the controller, two or more previously created multi-zone group scenes may be combined into a new group scene. In the illustrated example, the membership parameters identify the zone groups by previously created multi-zone group scenes. For example, using the user interface of the controller, the Party multi-zone group scene is created by selecting the BBQ and Gameday multi-zone group scenes to create a combined multi-zone group scene including the configuration information of both the BBQ and Gameday multi-zone group scenes. For example, the membership of the Party multi-zone group scene includes the zone groups identified in the configuration data 610, 615 of the BBQ and Gameday multi-zone group scenes.

Additionally, the Party multi-zone group scene can include a plurality of media sources for playback. The Party multi-zone group scene configuration data includes parameters identifying two sources as well as an identification of which zones are to present which media upon the instantiation of the Party multi-zone group scene. While the media sources are depicted as uniform resource locators (URLs) and uniform resource indicators (URIs), any compatible instruction and/or parameter may be included as a source to be presented via the media playback system or playback device. Some media source examples that may be referenced in this parameter include source devices, playlist identifications, media files, radio frequencies, etc.

It will be appreciated from the foregoing that the examples provided in the configuration data are not to be construed to be limiting in any way. In fact, the configuration data may be scaled to fit the desires of the creator of the multi-zone group scene and store as much or as little information as required and/or desired. These examples were provided to illustrate a simple embodiment of configuration data for multi-zone group scene creation.

Figure 7:
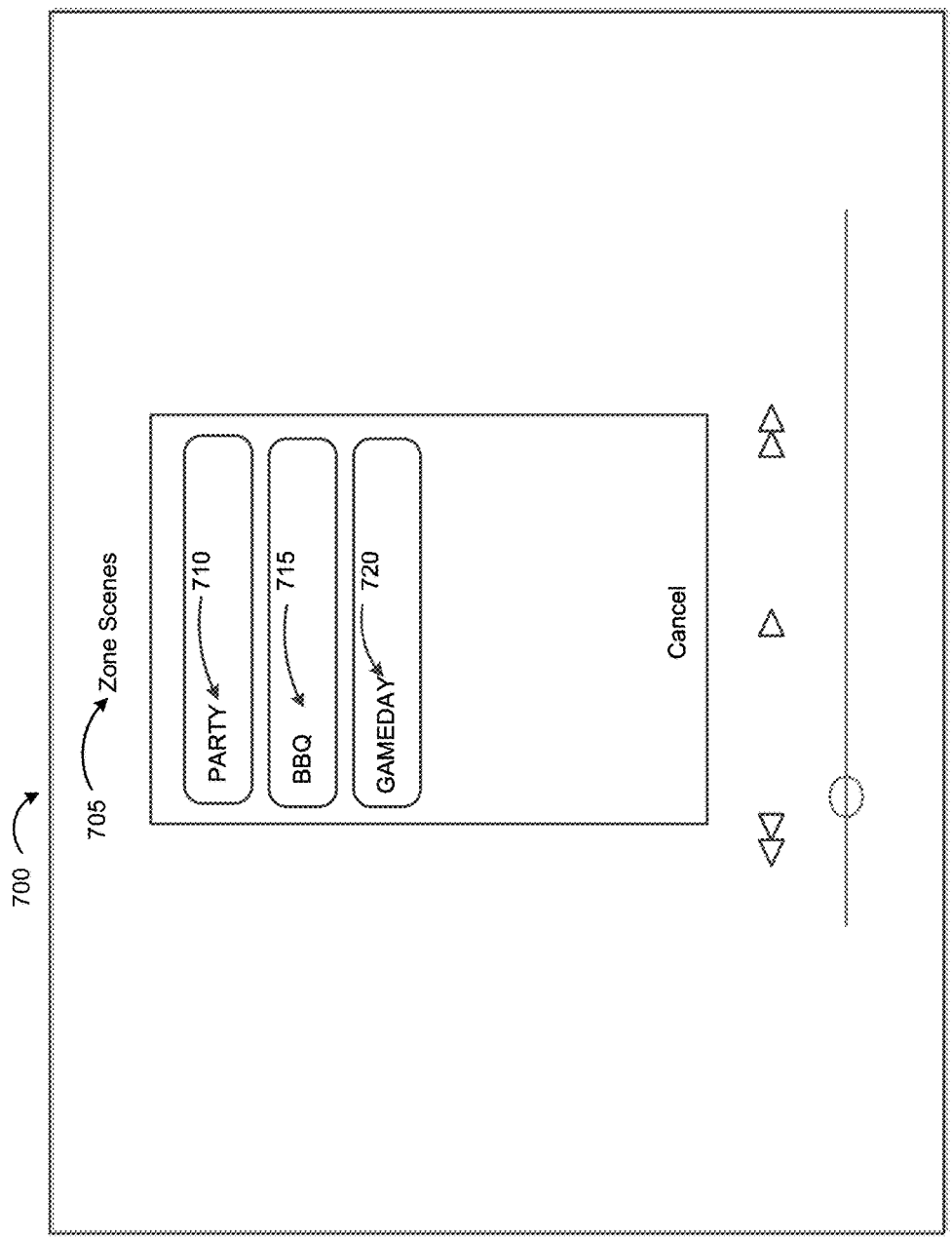
FIG. 7 shows an example user interface to instantiate a created multi-zone group scene.

FIG. 7 shows an embodiment of a user interface 700 for instantiating a multi-zone group scene. In the illustrated example, the selection of "Zone Scenes" 705 reveals a menu of available multi-zone group scenes for the media playback system such as "Party" 710, "BBQ" 715, and "Gameday" 720. These multi-zone group scenes have been generated in accordance with embodiments disclosed herein. The multi-zone group scenes of the zone scene menu 705 may be stored locally on the controller and/or on a zone player in the media playback system and/or in a remote server accessible by a zone player and/or controller. The list of available zone scenes 705 may be refreshed by polling the zone players and/or local storage of the controller and/or remote server to determine stored multi-zone group scenes for display in the zone scene menu 705. When a name and/or other indicator (e.g., an icon) of the desired multi-zone group scene is selected via the interface 700, the controller (e.g., control device 300) obtains (or instructs the zone player to obtain) configuration data associated with the desired multi-zone group scene. The controller also transmits a command to a zone player to load, utilize, and/or operate under the configuration data associated with the desired multi-zone group scene.

Figure 8:
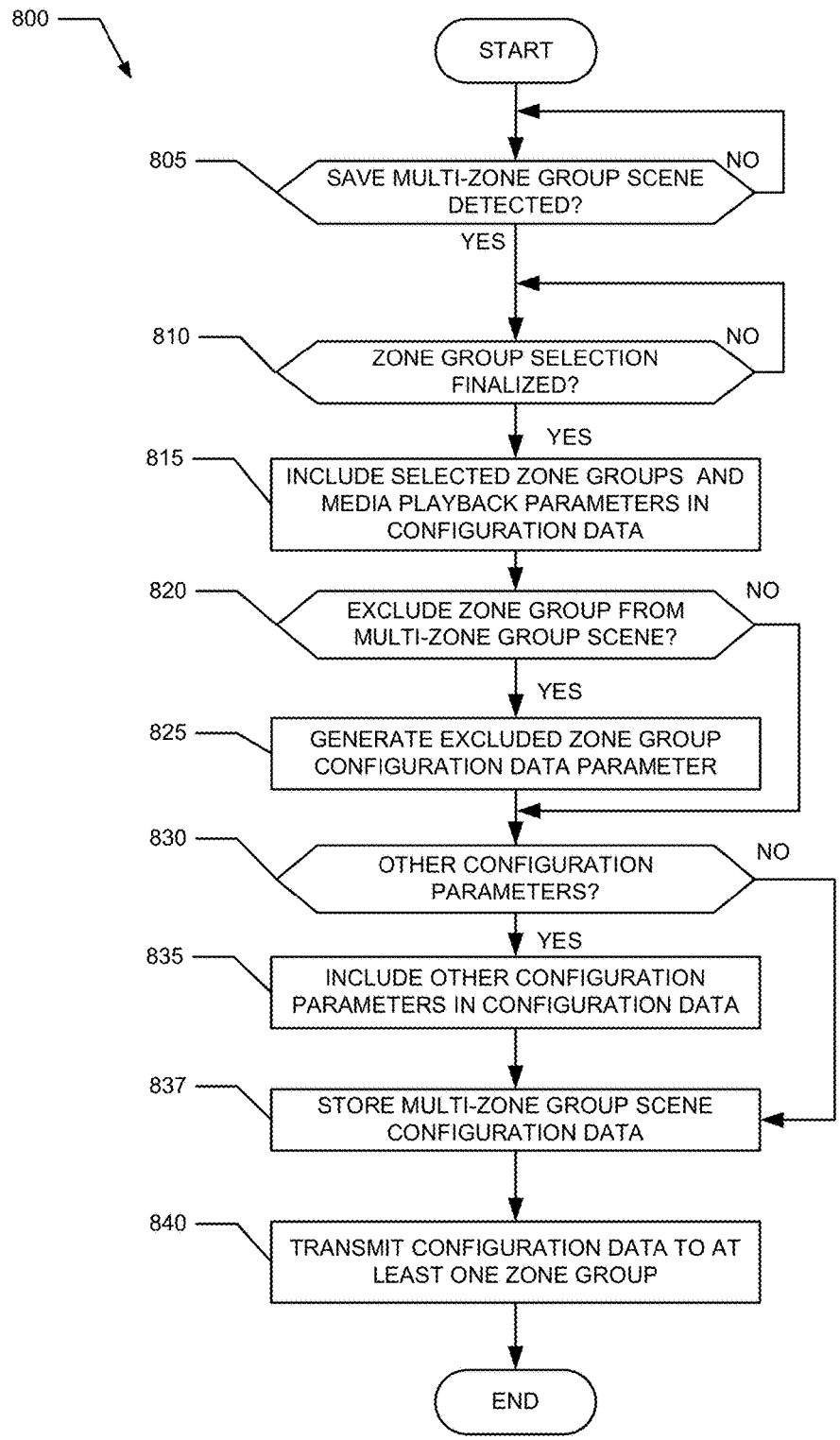
FIG. 8 shows an example flow diagram to create a multi-zone group scene at a controller.

Flow diagram 800 shown in FIG. 8 presents an embodiment of a method that can be implemented within an operating environment involving, for example, the media playback system 100 of FIG. 1, one or more of the playback device 200 of FIG. 2, and one or more of the control device 300 of FIG. 3. Method 800 may include one or more operations, functions, or actions as illustrated by one or more of blocks 805-840. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

FIG. 8 is a flowchart of example instructions 800 for storing configuration data for a multi-zone group scene. The example instructions 800 begin when a controller is powered on. When the controller monitors for a request to store a configuration for a multi-zone group scene (block 805). For example, a request to store a "Gameday" multi-zone group scene as discussed above may be detected. In other examples, this request to store a configuration may be a snapshot multi-zone group scene command. If no request to store a multi-zone group scene is detected, the controller device continues to monitor for such a request.

If a request to store a multi-zone group scene is detected, the controller determines if zone groups are selected to be included in the multi-zone group scene (block 810). For example, the desired multi-zone group scene may only include particular ones of zone groups and/or zone players in the media playback system. In the Gameday example, the kitchen and the living room are the only zone groups included in the Gameday multi-zone group scene. If no zone groups are selected to be included in the multi-zone group scene, the controller waits until zone groups are selected. In some examples, the controller presents the user with an option to select media to be associated with the multi-zone group scene as a whole or the zone groups individually. In other examples (e.g., a snapshot multi-zone group scene), the controller includes all zone groups in the media playback system in the multi-zone scene. When the zone group selection is finalized (e.g., a selection of a save button on the interface of the controller), the controller stores the selected zone groups and associated media as parameters in the configuration data of the multi-zone group scene (block 815). For example, the living room and kitchen zone groups and associated parameters in the Gameday example (e.g., volume, media content for playback, play mode setting, equalization, alarms, system state variable(s), routing table, playlist, etc.) are stored as the Gameday multi-zone group scene.

At block 820, the controller determines if any zone groups are to be excluded from the multi-zone group scene. For example, a certain zone group may be selected for exclusion for one or more reasons (e.g., an unoccupied zone of the household, a quiet zone, a zone occupied by one not desiring to hear audio, etc.) via the interface of the controller. If there are zone groups to be excluded from the multi-zone group scene, the controller generates a parameter for the configuration data indicating the desired zone group is to be excluded from the multi-zone scene upon instantiation (block 825) and proceeds to block 830. For example, in continuing the Gameday example, an area of the house for household members not desiring to experience the game may be excluded (e.g., a bedroom, office, etc.). If no zone groups are selected for exclusion from the multi-zone group scene, control proceeds to block 830.

The controller then determines if any additional configuration parameters are to be included in the configuration data for the multi-zone group scene (block 830). Additional configuration parameter examples include (1) a name of the multi-zone group scene and/or (2) zone group and/or multi-zone scene global parameters such as volume, equalizations, playlists, queues, communication protocols, player orientation, system state variable(s), routing table, playlist, etc. For example, the Gameday multi-zone group scene may be named, configured, and/or fine tuned. That is, if, for example, the living room zone group of the Gameday multi-zone group scene is currently configured to a music focused equalization setting, block 830 provides the ability to alter the equalization settings to a vocal broadcast and/or sports focused equalization (e.g., for a zone group in the multi-zone group scene, or globally for the multi-zone group scene). If additional configuration parameters are detected, the controller incorporates them into the configuration data for the multi-zone group scene (block 835). If no additional configuration parameters are detected, control proceeds to block 837.

In the illustrated example, the controller stores the configuration data for the multi-zone group scene on the controller (block 837). For example, the configuration data for the Gameday multi-zone group scene is stored at the controller. At the same time or shortly thereafter, the controller transmits the configuration data for the multi-zone scene to at least one zone player in at least one zone group (block 840). For example, the configuration data for the Gameday multi-zone group scene is transmitted to a first zone player in the media playback system. Alternatively, the configuration data for the multi-zone group scene is not stored at the controller. For example, the configuration data for the Gameday multi-zone group scene may be stored at the zone player that received the transmission containing the configuration data for the Gameday multi-zone group scene (e.g., the first zone player). In other examples, the configuration data for the multi-zone group scene may be transmitted to and/or stored at a remote server and/or other network-attached storage.

In some examples, the configuration data for the multi-zone group scene is transmitted to a random zone player. In other examples, the configuration data for the multi-zone group scene is transmitted to a designated "head" zone player. For example, the "head" zone player may be determined using a round-robin algorithm. In other example, the configuration data for the multi-zone group scene is not transmitted to a zone player until such time that the multi-zone group scene is to be instantiated.

Figure 9:
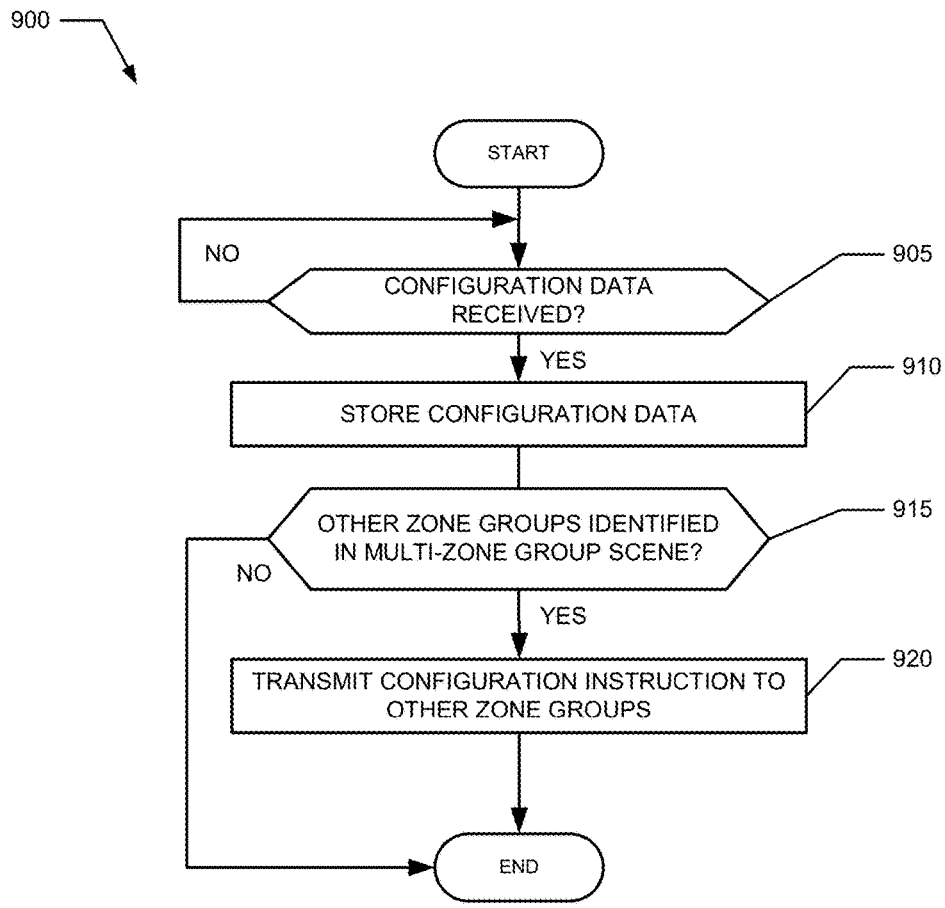
FIG. 9 shows an example flow diagram to store a multi-zone group scene at a playback device.

In the illustrated example, when the configuration data for the multi-zone group scene is transmitted, the example instructions terminate. In some examples, however, control may return to block 805 and continue to monitor for another request to save a multi-zone group scene. For example, the controller may await further instructions after the Gameday multi-zone group scene configuration data is transmitted to the first zone player. When the multi-zone group scene configuration data is transmitted to a zone player, the multi-zone group scene configuration data is stored at the zone player and relayed to other zone players in the media playback system. FIG. 9 provides an example flowchart for example instructions that may be used in an example embodiment to achieve such storing at a zone player.

FIG. 9 is a flowchart of example instructions 900 for storing configuration data for a multi-zone group scene at a playback device. The example instructions 900 begin when a zone player is powered on. The zone player monitors for a multi-zone group scene configuration data transmission from a controller (block 905). When the configuration data is received by the playback device, the playback device stores the configuration data on a local non-transitory memory (block 910). The playback device then determines if there are the other zone groups in the multi-zone group scene from the configuration data (block 915). If other zone groups are included in the multi-zone group scene, the playback device acts as a relay and transmits the configuration data to the other zone groups (block 920). If no other zone groups are included in the multi-zone group scene the instructions end. Likewise, once the configuration data has been transmitted to the other zone groups the instructions end. In some examples, however, control may return to block 905 and continue to monitor for another multi-zone group scene configuration data transmission from the controller.

Figure 10:
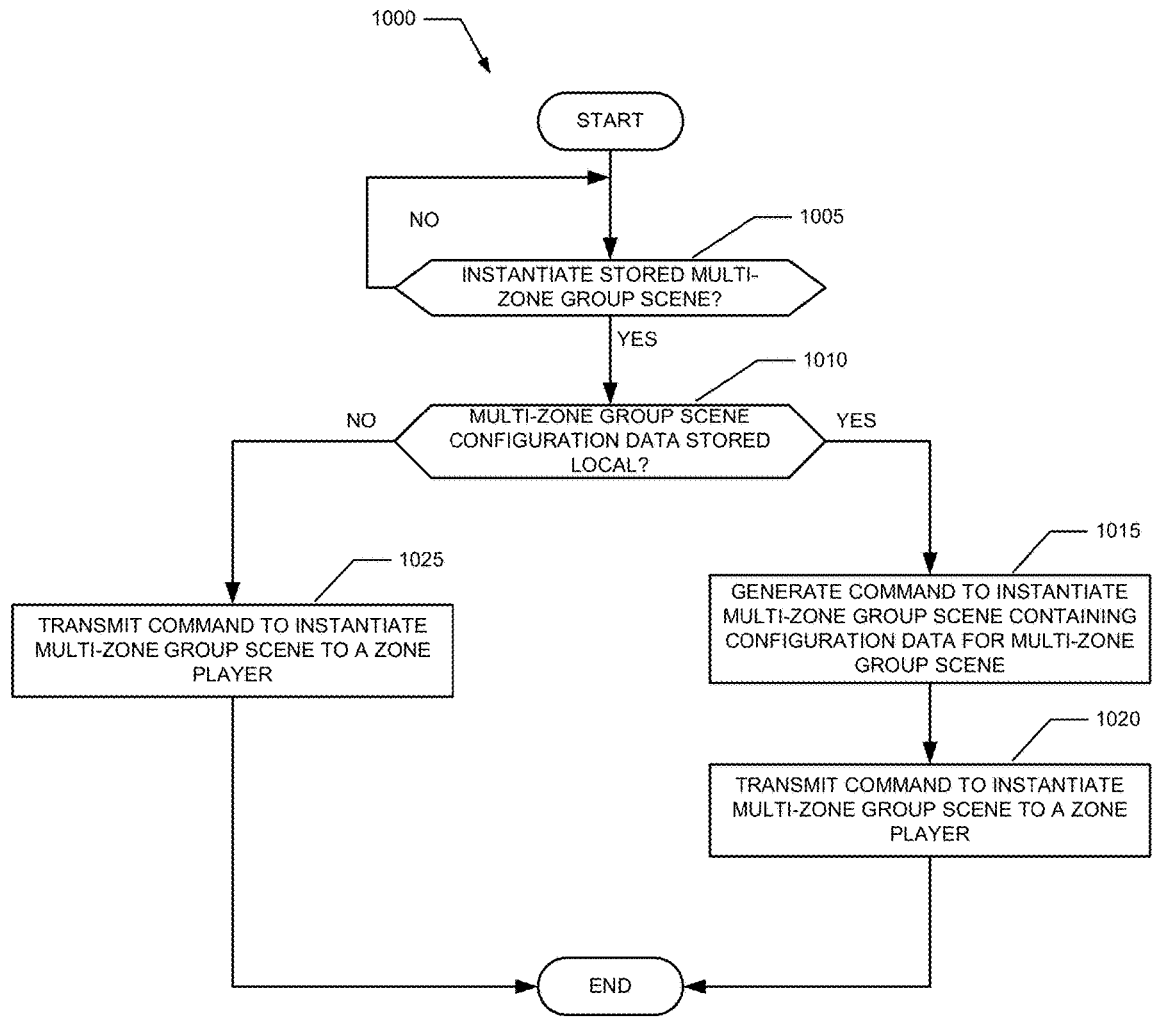
FIG. 10 shows an example flow diagram to instantiate a multi-zone group scene at a controller.

FIG. 10 is an example flowchart of example instructions 1000 for instantiating a multi-zone group scene at a controller. The example instructions 1000 begin when the controller is powered on. The controller monitors for a request to instantiate a stored multi-zone group scene (block 1005). When the request is detected, the controller determines if the multi-zone group scene configuration data is stored locally (e.g., on the controller) (block 1010). If the multi-zone group scene configuration data is stored locally, the controller generates a command to trigger the multi-zone group scene at a zone player that includes the multi-zone group scene configuration data (block 1015). For example, the generated command to trigger may further include data for parameters such as volume, media content, play mode setting, equalization, alarms, network configurations and/or topology, system state variable(s), routing table, playlist, etc. The generated command including the multi-zone group scene configuration data is transmitted by the controller to a first playback device (block 1020).

Figure 11:
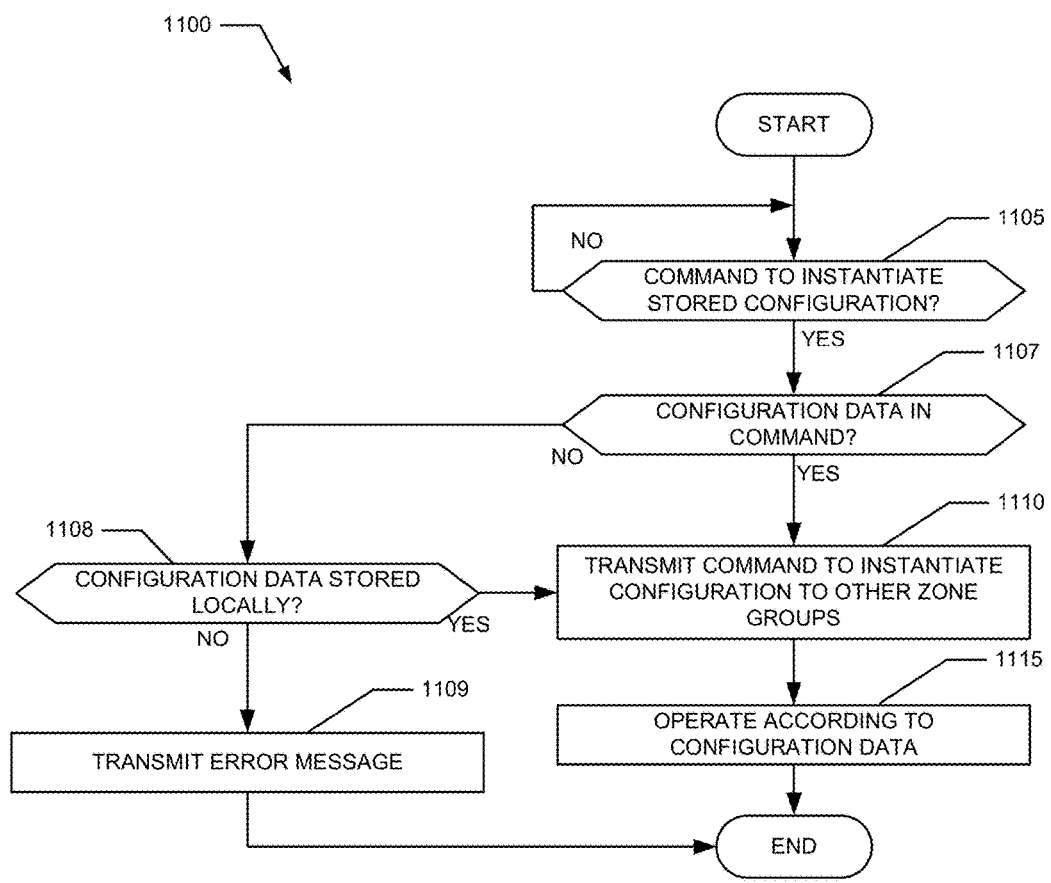
FIG. 11 shows an example flow diagram to instantiate a multi-zone group scene at a playback device.

If the multi-zone group scene configuration data is not stored locally on the controller, the controller assumes that the multi-zone group scene configuration data is stored at a playback device and/or remote server. To that end, the controller transmits a command to instantiate the multi-zone group scene to a first zone player without multi-zone group scene configuration data (block 1025). When the command to instantiate is transmitted, a zone player must analyze the command and, in some examples, the included multi-zone group scene configuration data. FIG. 11 provides an example embodiment of such command analysis at a zone player.

FIG. 11 is an example flowchart of example instructions 1100 for instantiating a multi-zone group scene at a playback device. The example instructions 1100 begin when the playback device is powered on. The playback device monitors for a command to instantiate a stored multi-zone group scene (block 1105). When the command is received, the playback device determines if the multi-zone group scene configuration data was transmitted with the command (block 1107). If the multi-zone group scene configuration data was not stored in the command, the playback device determines if the multi-zone group scene configuration data is stored locally (block 1108). If the multi-zone group scene configuration data is not stored locally, the playback device transmits an error message (block 1109) indicating the multi-zone group scene cannot be instantiated with this playback device. Control terminates after the transmission of the error message.

Returning to blocks 1107 and 1108, if the multi-zone group scene configuration data is stored locally or transmitted with the instantiation command, the playback device relays the command to instantiate the multi-zone group scene to the other zone groups in the multi-zone group scene (block 1110). The playback device then begins operation using the configuration data for the multi-zone group scene (block 1115). The playback device continues to operate under the configuration data for the multi-zone group scene until instructed otherwise and/or powered down.

Figure 12:
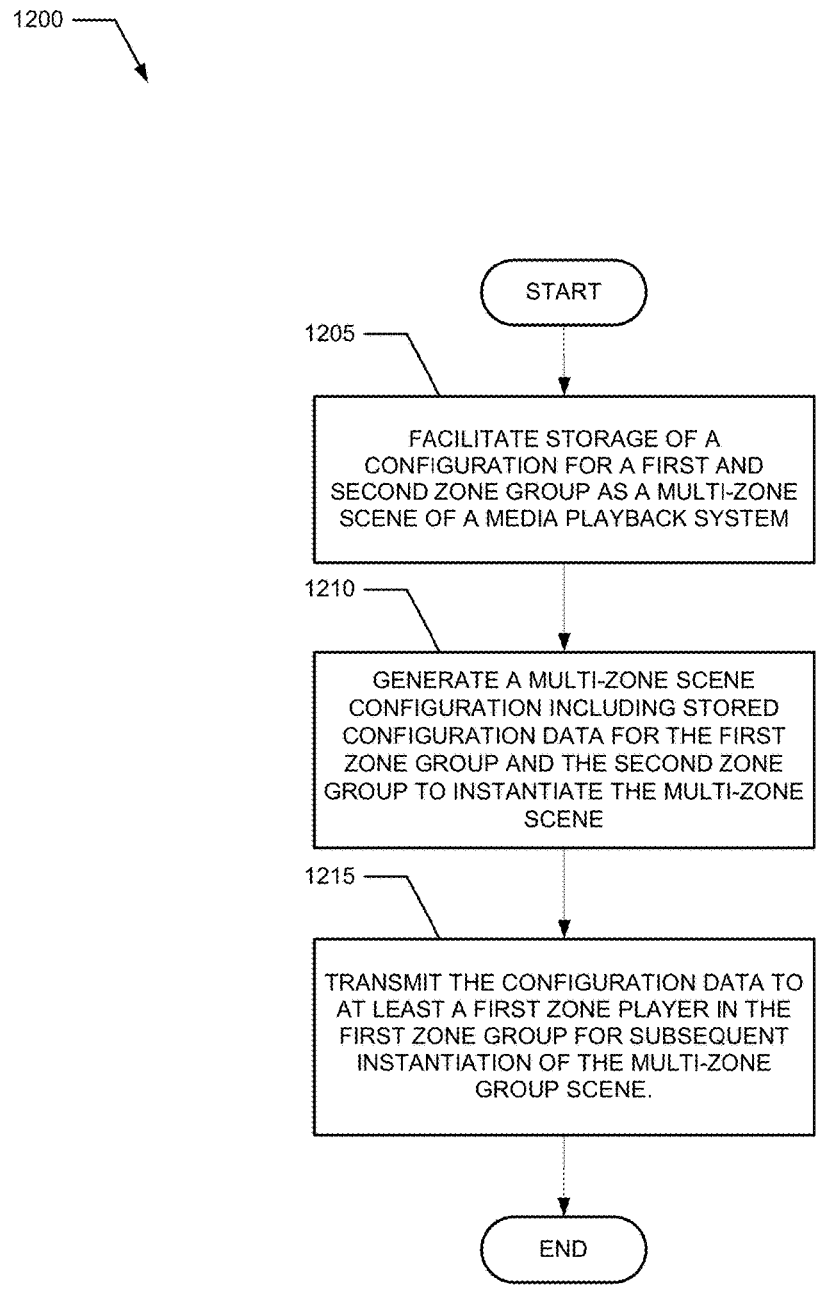
FIG. 12 shows an example flow diagram to create a multi-zone group scene at a controller.

FIG. 12 is a flowchart of example instructions 1200 for storing configuration data for a multi-zone group scene. The example instructions 1200 begin when a controller is powered on. The example controller facilitates, via a user interface of a controller, storage of a configuration of multiple zone groups as a multi-zone scene of a media playback system (block 1205). For example, the media playback system includes at least a first zone group including at least two zone players and a second zone group. The user interface of the controller facilitates the storage of the configuration of multiple zone groups as a multi-zone group scene by, for example, presenting at least an indication of (1) the first zone group, (2) the second zone group, and (3) a multi-zone group scene creation command.

The example controller generates, for example, based on a detected triggering of the multi-zone group scene creation command, a multi-zone scene configuration including stored configuration data for the first zone group and the second zone group to instantiate the multi-zone scene (block 1210). For example, the configuration data is based on identified parameters associated with the captured configuration of the multiple zone groups of the media playback system. Such identified parameters may be identified and/or their selection facilitated via the controller. For example, the parameters may include zone players currently associated with the first zone group and the second zone group, an indication that the first zone group and the second zone group belong to the multi-zone group scene, media to be presented via the multi-zone group scene, network configuration, etc.

The controller transmits the configuration data to at least the first zone player in the first zone group for subsequent instantiation of the multi-zone group scene. For example, the controller may store the configuration data first and then transmit the configuration data to a zone player. In other examples, the controller transmits the configuration data to a remote server storing multi-zone group scene configuration data. Additionally, the zone player may then transmit the configuration data to other zone players in the media playback system regardless of current zone grouping. In other examples, the controller stores the configuration data and transmits the configuration data to the zone player at the time the multi-zone group scene is requested to be instantiated. In yet other examples, the zone player may transmit the configuration data to the controller and/or other controllers associated with the media playback system. The example instructions 1200 end when the configuration data has been transmitted to from the controller.

Figure 13:
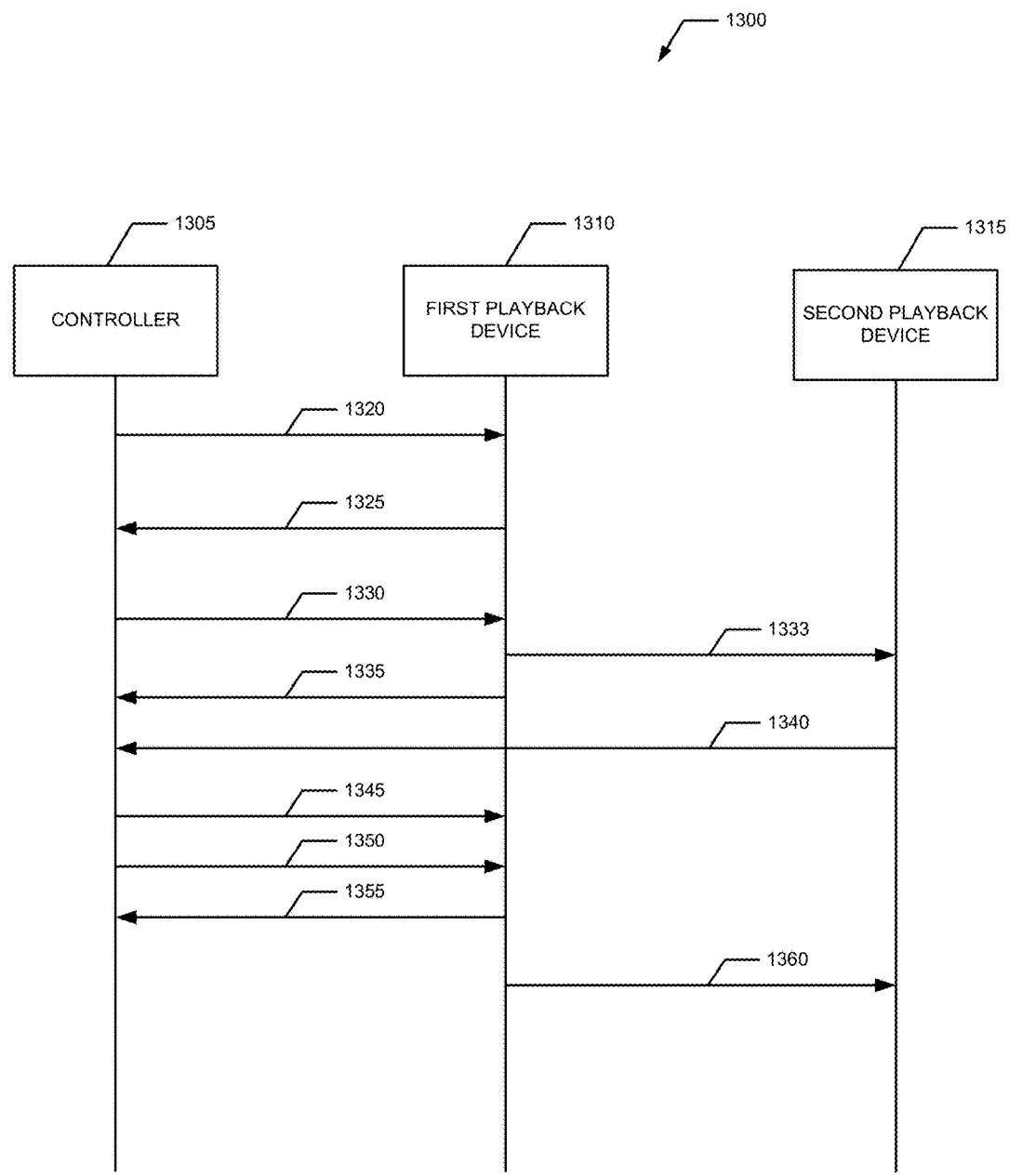
FIG. 13 shows an example diagram of data flow in a media playback system in accordance with methods disclosed herein.

FIG. 13 is an example data flow diagram in the media playback system with respect to a snapshot multi-zone group scene generation command and a later instantiation of the snapshot multi-zone group scene.

In normal operation, the controller 1305 sends commands to a first playback device 1310 (1320). In some examples, the controller 1305 sends a command to the first playback device to dictate or direct the first playback device 1310 with respect to media to be presented on the first playback device 1310. For example, the controller 1305 may send a command to trigger the first playback device to play a Thelonious Monk playlist.

The example first playback device 1310 responds to the command of the controller 1305 with an acknowledgement of the command (1325). In some examples, the first playback device 1310 may include in the acknowledgement message 1325 parameters indicative of the current status of the first playback device such as, for example, network status, current media playback status, details and/or metadata descriptive of files stored locally at the first playback device 1310, etc.

At some time later, a snapshot command to create a multi-zone group scene is generated at the controller 1305. The snapshot multi-zone group scene generation command is communicated to the first playback device 1310 (1330). The command for the snapshot multi-zone group scene triggers the receiving playback device to transmit the current configuration data that the playback device is operating subject to. For example, such information may include current zone grouping, media playback, audio and/or equalization settings, network configuration etc. The first playback device 1310 routes the snapshot multi-zone group scene generation command to at least a second playback device 1315 in the media playback system (1333).

In some examples, the first playback device 1310 broadcasts the snapshot multi-zone group scene generation command to all devices in the media playback system. In yet other examples, the second playback device 1315 broadcasts the snapshot multi-zone group scene generation command to a third playback device which, in turn, transmits the snapshot multi-zone group scene generation command to a fourth playback device. This example process may repeat until such a time all playback devices in the media playback system have received the snapshot multi-zone group scene generation command.

The first playback device 1310 transmits current configuration data associated with the first playback device 1310 back to the controller 1305 in response to receiving the snapshot multi-zone group scene command (1335). For example, current configuration data may include network status, current media playback status, details and/or metadata descriptive of files stored locally at the playback device, current volume, current media content and/or source being presented at the first playback device, current playback queue, current play mode setting, current equalization, active and/or inactive alarms, system state variable(s), routing table, playlist, etc. Similarly, the second playback device 1315 transmits current configuration data associated with the second playback device 1315 back to the controller 1305 in response to the snapshot multi-zone group scene command (1340). Again, such information may include, for example, current zone grouping, media playback, audio and/or equalization settings, network configuration, etc. associated with the corresponding playback device.

The current configuration data associated with the first playback device 1310 and the second playback device 1315 are transmitted back to the controller 1305 so that the controller 1305 may generate configuration data for the snapshot multi-zone group scene in accordance with methods disclosed herein. For example, the current configuration data associated with the first playback device 1310 and the second playback device 1315 are stored in a file and/or data structure and associated with an indicator or name such that the snapshot multi-zone group scene may be later instantiated. That is, the state of the media playback system at the time of the snapshot (e.g., a snapshot multi-zone group scene) may be returned to at a later time. The generated configuration data file and/or data structure contains multi-zone group scene configuration data for the snapshot of the media playback system. In sum, the controller 1305 gathers the configuration data for the playback devices in the media playback system and forms the gathered configuration data into multi-zone group scene configuration data.

When the controller 1305 has generated the multi-zone group scene configuration data for the snapshot, the controller 1305 transmits the generated multi-zone group scene configuration data for the snapshot multi-zone group scene to the first playback device 1310 (1345). The first playback device 1310 stores the multi-zone group scene configuration data for the snapshot multi-zone group scene. In the example FIG. 13, the controller 1305 does not store the multi-zone group scene configuration data, rather the controller 1305 only stores an indication that a snapshot multi-zone group scene exists and not the actual configuration data for the snapshot multi-zone group scene itself. The storage of the multi-zone group scene configuration data in the illustrated example is located at the first playback device 1310. However, it will be appreciated that, in some examples, the controller 1305 and/or a remote server may be configured to store the multi-zone group scene configuration data for the snapshot multi-zone group scene.

Returning to the example FIG. 13, at a later time, the controller 1305 generates a command to instantiate the snapshot multi-zone group scene and transmits the command to instantiate to a first playback device 1310 (1350). This command to instantiate the snapshot multi-zone group scene is acknowledged by the first playback device 1310 (1355). Accordingly, the first playback device 1310 begins operating subject to the multi-zone group scene configuration data for the respective snapshot multi-zone group scene. The first playback device 1310 transmits the multi-zone group scene configuration data and a command to instantiate the snapshot multi-zone group scene to the second playback device 1315 (1360). The second playback device 1315 begins operating subject to the multi-zone group scene configuration data for the snapshot multi-zone group scene.

In some examples, the first playback device 1315 broadcasts the snapshot multi-zone group scene configuration data and command to instantiate to all devices in the media playback system. In yet other examples, the second playback device 1315 broadcasts the snapshot multi-zone group scene configuration data and command to instantiate to a third playback device which, in turn, transmits the snapshot multi-zone group scene configuration data and command to instantiate to a fourth playback device. This example process may repeat until such a time all playback devices in the media playback system have received the snapshot multi-zone group scene configuration data and command to instantiate.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:
1. A method comprising:
    displaying, via a display interface of a controller device, a graphical indicator, that when selected, causes storing of configuration data, wherein the configuration data is associated with a multi-zone group scene of a media playback system, wherein the media playback system comprises a first zone group and a second zone group, wherein the first zone group comprises a first zone player, and wherein the second zone group comprises a second zone player and a third zone player;
    detecting, via the controller device, a selection of the indicator that causes the storing of the configuration data of the multi-zone group scene;
    in response to the detecting, (i) storing, at the second zone player, the configuration data of the multi-zone group scene and (ii) simultaneously displaying, via the display interface, a graphical indicator for each of (1) the first zone group, (2) the second zone group, and (3) the multi-zone group scene, wherein the multi-zone group scene comprises the first, second, and third zone players;
    detecting, via the display interface, respective selections of the graphical indicator of the first zone group, the graphical indicator of the second zone group, and the graphical indicator of the multi-zone group scene;
    in response to detecting the selection of the indicator of the first zone group, transmitting, via the controller device, one or more first commands that configure the first zone player for playback of audio content in the first zone group and independent of the second and third zone players;

in response to detecting the selection of the indicator of the second zone group, transmitting, via the controller device, one or more second commands that configure the second and third zone players for playback of audio content in synchrony with one another and independent of the first zone player;

in response to detecting the selection of the indicator of the multi-zone group scene, transmitting one or more third commands to the second zone player of the second zone group; and based on the one or more third commands, instantiating, via the second zone player, the multi-zone group scene according to the stored configuration data, wherein the instantiating comprises (i) configuring the second and third zone players of the second zone group for playback of audio content and (ii) transmitting, via the second zone player, one or more fourth commands to the first zone player of the first zone group, wherein the fourth commands configure the first zone player of the first zone group for playback of audio content.

2. The method of claim 1, further comprising, in response to detecting the selection of the indicator that causes the storing of the configuration data of the multi-zone group scene, facilitating, via the controller device, creating a name of the multi-zone group scene; and associating the name with the configuration data of the multi-zone group scene.

3. The method of claim 1, wherein the instantiating comprises transmitting one or more commands that configure the first, second, and third zone players for playback of audio content in synchrony with one another.

4. The method of claim 1, wherein storing the configuration data of the multi-zone group scene comprises storing configuration parameters, wherein the configuration parameters comprise one or more of a) a volume level for audio playback for each zone in the zone group, b) a mute or unmute setting for audio playback, c) media content for playback, d) a play mode setting, e) an equalization setting for audio playback, and f) an audio alarm.

5. The method of claim 1, wherein the media playback system further comprises a third zone group, wherein the third zone group further comprises a fourth zone player, and wherein storing the configuration data of the multi-zone group comprises storing a configuration parameter that excludes the third zone group from the multi-zone group scene.

6. The method of claim 1, wherein the media playback system further comprises a third zone group, wherein the third zone group further comprises a fourth zone player, and wherein the instantiating comprises:

instructing the second zone player to transmit one or more commands that configure the third zone player of the fourth zone group for playback of audio content.

7. The method of claim 6, wherein the instantiating comprises:

transmitting one or more commands that configure the first, second, and third zone players for playback of audio content in synchrony with one another and independent of the fourth zone player.

8. A controller device comprising:

at least one processor; and a tangible, non-transitory computer-readable memory storing instructions that, when executed by the at least one processor, cause the controller device to perform functions comprising:

displaying, via a display interface of the controller device, a graphical indicator that, when selected, causes storing of configuration data, wherein the configuration data is associated with a multi-zone group scene of a media playback system, wherein the media playback system comprises a first zone group and a second zone group, wherein the first zone group comprises a first zone player, and wherein the second zone group comprises a second zone player and a third zone player;

detecting a selection of the indicator that causes the storing of the configuration data of the multi-zone group scene;

in response to the detecting, (i) instructing the second zone player to store the configuration data of the multi-zone group scene and (ii) simultaneously displaying, via the display interface, a graphical indicator for each of (1) the first zone group, (2) the second zone group, and (3) the multi-zone group scene, wherein the multi-zone group scene comprises the first, second, and third zone players;

detecting, via the display interface, respective selections of the graphical indicator of the first zone group, the graphical indicator of the second zone group, and the graphical indicator of the multi-zone group scene;

in response to detecting the selection of the indicator of the first zone group, transmitting one or more first commands that configure the first zone player for playback of audio content in the first zone group and independent of the second and third zone players;

in response to detecting the selection of the indicator of the second zone group, transmitting one or more second commands that configure the second and third zone players for playback of audio content in synchrony with one another and independent of the first zone player; and in response to detecting the selection of the indicator of the multi-zone group scene, transmitting one or more third commands to the second zone player of the second zone group, wherein the one or more third commands instruct the second zone player to instantiate the multi-zone group scene according to the stored configuration data, wherein the instantiating comprises (i) configuring the second and third zone players of the second zone group for playback of audio content and (ii) transmitting, via the second zone player, one or more fourth commands to the first zone player of the first zone group, wherein the fourth commands configure the first zone player of the first zone group for playback of audio content.

9. The controller device of claim 8, wherein the functions further comprise:

in response to detecting the selection of the indicator that causes the storing of the configuration data of the multi-zone group scene, facilitating creating a name of the multi-zone group scene; and associating the name with the configuration data of the multi-zone group scene.

10. The controller device of claim 8, wherein the instantiating comprises transmitting one or more commands that configure the first, second, and third zone players for playback of audio content in synchrony with one another.

11. The controller device of claim 8, wherein storing the configuration data of the multi-zone group scene comprises storing configuration parameters, wherein the configuration parameters comprise one or more of a) a volume level for audio playback for each zone in the zone group, b) a mute or unmute setting for audio playback, c) media content for playback, d) a play mode setting, e) an equalization setting for audio playback, and f) an audio alarm.

12. The controller device of claim 8, wherein the media playback system further comprises a third zone group, wherein the third zone group further comprises a fourth zone player, and wherein storing the configuration data of the multi-zone group comprises storing a configuration parameter that excludes the third zone group from the multi-zone group scene.

13. The controller device of claim 8, wherein the media playback system further comprises a third zone group, wherein the third zone group further comprises a fourth zone player, and wherein the instantiating comprises:
instructing the second zone player to transmit one or more commands that configure the third zone player of the fourth zone group for playback of audio content.

14. The controller device of claim 13, wherein the instantiating comprises:
transmitting one or more commands that configure the first, second, and third zone players for playback of audio content in synchrony with one another and independent of the fourth zone player.

15. A tangible, non-transitory computer-readable memory storing instructions that, when executed by a processor, cause a controller device to perform functions comprising:
displaying, via a display interface of the controller device, a graphical indicator, that when selected, causes storing of configuration data, wherein the configuration data is associated with a multi-zone group scene of a media playback system, wherein the media playback system comprises a first zone group and a second zone group, wherein the first zone group comprises a first zone player, and wherein the second zone group comprises a second zone player and a third zone player;
detecting a selection of the indicator for storing the configuration data of the multi-zone group scene;
in response to the detecting, (i) instructing the second zone player to store the configuration data of the multi-zone group scene and (ii) simultaneously displaying, via the display interface, a graphical indicator for each of (1) the first zone group, (2) the second zone group, and (3) the multi-zone group scene, wherein the multi-zone group scene comprises the first, second, and third zone players;
detecting, via the display interface, respective selections of the graphical indicator of the first zone group, the graphical indicator of the second zone group, and the graphical indicator of the multi-zone group scene;
in response to detecting the selection of the indicator of the first zone group, transmit one or more first commands that configure the first zone player for playback of audio content in the first zone group and independent of the second and third zone players;
in response to detecting the selection of the indicator of the second zone group, transmit one or more second commands that configure the second and third zone players for playback of audio content in synchrony with one another and independent of the first zone player; and
in response to detecting the selection of the indicator of the multi-zone group scene, transmitting one or more third commands to the second player of the second zone group, wherein the one or more third commands instruct the second zone player to instantiate the multi-zone group scene according to the stored configuration data, wherein the instantiating comprises (i) configuring the second and third zone players of the second zone group for playback of audio content and (ii) transmitting, via the second zone player, one or more fourth commands to the first zone player of the first zone group, wherein the fourth commands configure the first zone player of the first zone group for playback of audio content.

16. The non-transitory computer-readable memory of claim 15, wherein the functions further comprise:
in response to detecting the selection of the indicator for causing the storing of the configuration data of multi-zone group scene, facilitating creation of a name of the multi-zone group scene; and
associating the name with the configuration data of the multi-zone group scene.

17. The non-transitory computer-readable memory of claim 15, wherein the instantiating comprises transmitting one or more commands that configure the first, second, and third zone players for playback of audio content in synchrony with one another.

18. The non-transitory computer-readable memory of claim 15, wherein storing the configuration data of the multi-zone group scene comprises storing configuration parameters, wherein the configuration parameters comprise one or more of a) a volume level for audio playback for each zone in the zone group, b) a mute or unmute setting for audio playback, c) media content for playback, d) a play mode setting, e) an equalization setting for audio playback, and f) an audio alarm.

19. The non-transitory computer-readable memory of claim 15, wherein the media playback system further comprises a third zone group, wherein the third zone group further comprises a fourth zone player, and wherein storing the configuration data of the multi-zone group comprises storing a configuration parameter that excludes the third zone group from the multi-zone group scene.

20. The non-transitory computer-readable memory of claim 15, wherein the media playback system further comprises a third zone group, wherein the third zone group further comprises a fourth zone player, and wherein the instantiating comprises:
instructing the second zone player to transmit one or more commands that configure the third zone player of the fourth zone group for playback of audio content.

21. The non-transitory computer-readable storage memory of claim 20, wherein the instantiating comprises:
transmitting one or more commands that configure the first, second, and third zone players for playback of audio content in synchrony with one another and independent of the fourth zone player.

* * * * *